(12) United States Patent
Iwai et al.

(10) Patent No.: US 10,889,172 B2
(45) Date of Patent: Jan. 12, 2021

(54) MOUNTING PORTION STRUCTURE OF DOOR MIRROR

(71) Applicant: HONDA MOTOR CO., LTD., Tokyo (JP)

(72) Inventors: Yutaka Iwai, Wako (JP); Yasuhiro Sasaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 51 days.

(21) Appl. No.: 16/464,695

(22) PCT Filed: Nov. 10, 2017

(86) PCT No.: PCT/JP2017/040606
§ 371 (c)(1),
(2) Date: May 29, 2019

(87) PCT Pub. No.: WO2018/110175
PCT Pub. Date: Jun. 21, 2018

(65) Prior Publication Data
US 2019/0381876 A1 Dec. 19, 2019

(30) Foreign Application Priority Data
Dec. 15, 2016 (JP) .................. 2016-243704

(51) Int. Cl.
*B60J 10/78* (2016.01)
*B60J 10/86* (2016.01)
(Continued)

(52) U.S. Cl.
CPC ............... *B60J 10/78* (2016.02); *B60J 10/72* (2016.02); *B60J 10/86* (2016.02); *B60R 1/06* (2013.01)

(58) Field of Classification Search
CPC .... B60R 1/06; B60J 10/85; B60J 10/86; B60J 10/78; B60J 10/72
(Continued)

(56) References Cited

U.S. PATENT DOCUMENTS

| 2012/0235009 A1* | 9/2012 | Horie | ................. B60R 1/06 248/475.1 |
| 2015/0210149 A1* | 7/2015 | Saiki | ................. B60J 10/30 296/152 |

(Continued)

FOREIGN PATENT DOCUMENTS

| JP | 3608509 | 1/2005 |
| JP | 2009-298250 | 12/2009 |
| JP | 2015-016753 | 1/2015 |

OTHER PUBLICATIONS

International Search Report and Written Opinion for International Application No. PCT/JP2017/040606 dated Feb. 13, 2018, 7 pgs.

*Primary Examiner* — Jason S Morrow
(74) *Attorney, Agent, or Firm* — Amin, Turocy & Watson, LLP

(57) ABSTRACT

A door mirror has a mirror base attached to a door-side panel, and a mirror seal disposed between the mirror base and the door-side panel. A concave section at least a part thereof is formed by an outer edge portion of the mirror seal and that opens toward a side of a door is provided at an inner side of a front edge portion of the mirror base. A door weatherstrip has a wind entering restriction wall that crosses a front side of the door-side panel and protrudes in a vehicle outer side than the door-side panel, and that is inserted into the concave section.

6 Claims, 9 Drawing Sheets

(51) Int. Cl.
 B60R 1/06 (2006.01)
 B60J 10/72 (2016.01)
(58) Field of Classification Search
 USPC ........................................................ 296/1.11
 See application file for complete search history.

(56) References Cited

U.S. PATENT DOCUMENTS

2017/0113528 A1* 4/2017 Kawase .................. B60J 10/40
2019/0077230 A1* 3/2019 Tallent .................... B60J 10/79
2020/0114744 A1* 4/2020 Matsuura ................ B60J 10/36

* cited by examiner

MOUNTING PORTION STRUCTURE OF DOOR MIRROR

TECHNICAL FIELD

The present invention relates to a mounting portion structure of a door mirror in a vehicle.

Priority is claimed on Japanese Patent Application No. 2016-243704, filed Dec. 15, 2016, the content of which is incorporated herein by reference.

BACKGROUND ART

As a mounting portion structure of a door mirror, a structure in which a mirror seal is attached to a surface of a mirror base on a side of a door, and the mirror base is fixed to a door upper panel with the mirror seal sandwiched therebetween is known (for example, see Patent Literature 1).

In the mounting portion structure of a door mirror disclosed in Patent Literature 1, an extension wall extending toward a front side of a vehicle is formed at a front end portion of the mirror seal attached to the mirror base. A door weatherstrip configured to close a space between the door and the door opening section on a side of a vehicle body is attached to an outer circumferential region of the door. A seal wall extending toward an outside of the door opening section on the side of the vehicle body and in close contact with a circumferential edge portion of the door opening section is provided on the door weatherstrip. The extension wall of the mirror seal is formed to abut an outer surface of the seal wall of the door weatherstrip at a front side of the mirror base.

In the mounting portion structure, by making the extension wall of the mirror seal to abut the seal wall of the weatherstrip, it is possible to prevent traveling air from entering inside of the mounting portion of the door mirror.

CITATION LIST

Patent Literature

[Patent Literature 1]
Japanese Patent No. 3608509

SUMMARY OF INVENTION

Technical Problem

However, since the mounting portion structure of a door mirror disclosed in Patent Literature 1 is configured that the extension wall extending forward from the front end portion of the mirror seal abuts the seal wall of the weatherstrip in a state in which the extension wall is exposed to outside of the vehicle, the abutting portion between the extension wall and the weatherstrip can be seen from outside of the vehicle, and therefore, it is not preferable in terms of appearance.

An aspect of the present invention provides a mounting portion structure of a door mirror in which entry of traveling air into the inside of the mounting portion structure of a door mirror is suppressed, without causing deterioration in the appearance thereof from outside the vehicle.

Solution to Problem

A mounting portion structure of a door mirror according to the present invention employs the following configurations.

(1) A mounting portion structure of a door mirror according to an aspect of the present invention includes a door-side panel; a door mirror having a mirror base attached to the door-side panel and a mirror seal disposed between the mirror base and the door-side panel; and a door weatherstrip attached to an outer edge portion of a door and configured to close a space between the door and a door opening section of a vehicle body, wherein a concave section at least a part thereof is formed by an outer edge portion of the mirror seal and that opens toward a side of the door is provided at an inner side of a front edge portion of the mirror base, and the door weatherstrip has a wind entering restriction wall that crosses a front side of the door-side panel and protrudes in a vehicle outer side than the door-side panel, and that is inserted into the concave section.

According to the configuration of (1), since the wind entering restriction wall of the door weatherstrip is inserted into the concave section at an inner side of the front edge portion of the mirror base while crossing in front of the door-side panel, traveling air that may flow into a space between the door-side panel and the mirror base or the inside of the mirror base can be blocked by the wind entering restriction wall. In addition, since a tip portion of the wind entering restriction wall is inserted into the concave section positioned at inner side of the front edge portion of the mirror base, the tip portion cannot be seen from an outside of the vehicle. Accordingly, appearance from the outside of the vehicle is improved.

(2) In the aspect of (1), a thickness of the wind entering restriction wall may be smaller than a width of the concave section in a forward/rearward direction.

In the case of the above (2), even if there is some variation during assembly of the door mirror or the door weatherstrip, the wind entering restriction wall can be easily inserted into the concave section. Accordingly, when the configuration is employed, deterioration of assembly performance can be prevented.

In this configuration, while the wind entering restriction wall may not directly abut with the inner wall of the concave section, since the wind entering restriction wall constitutes a labyrinth structure between the concave section and the wind entering restriction wall, it is possible to suppress entry of moving air into a space between the door-side panel and the mirror base or the inside of the mirror base.

(3) In the aspect of (1) or (2), the mirror seal may include: a seal main body section extending along the door-side panel; an outside extension section extending from a front end portion of the seal main body section toward the vehicle outer side; and a front extension section extending forward from an end portion of the outside extension section at the vehicle outer side and having a front end portion thereof abutting a front-side circumferential wall of the mirror base, and the concave section may be formed so as to be surrounded by the circumferential wall of the mirror base, and the outside extension section and the front extension section of the mirror seal.

In the case of the above (3), a shape of the mirror seal can be simplified in comparison with the case in which the concave section is formed in a single body of the mirror seal. Accordingly, when the configuration is employed, the mirror seal can be easily manufactured.

(4) In the aspect of (3), the front extension section may have an easily deformable section, which is more easily deformed than the other area of the front extension section, formed at a front end portion thereof, and the easily deformable section may be abutted with the circumferential wall of the mirror base.

In the case of the above (4), the front extension section of the mirror seal can easily and securely come in close contact with a circumferential wall of the mirror base on a front side. Accordingly, it is possible to securely suppress traveling air from flowing into the mirror base. In addition, even if the easily deformable section abuts the peripheral wall of the mirror base on a front side and bends greatly, since the easily deformable section is disposed in the concave section inside the front edge portion of the mirror base, the easily deformable section is not able to be seen from outside, and there is no deterioration in appearance thereof.

(5) In the aspect of (4), the easily deformable section may be formed in a lip shape extending forward and toward an inner side of the vehicle.

In the case of the above (5), when the outside extension section and the front extension section of the mirror seal are assembled by being inserted into the inside of the mirror base, the easily deformable section is deformed according to the insertion. For this reason, warping of the easily deformable section during assembly can be prevented.

Accordingly, when the configuration is employed, assembly workability of the mirror seal is increased.

(6) In the aspect of (5), a second outside extension section extending toward the vehicle outer side and abutting with the mirror base in an extension direction of the second outside extension section may be provided so as to extend from the front extension section.

In the case of (6), since rigidity of the front extension section is increased by the second outside extension section, excessive bending of the base section of the easily deformable section or folding deformation of the front extension section to the outside extension section using the articulated section as an origin can be prevented. Accordingly, when the configuration is employed, sealability between the inner surface of the mirror base and the mirror seal can be increased.

Advantageous Effects of Invention

According to the aspect of the present invention, since the wind entering restriction wall of the door weatherstrip is inserted into the concave section at an inner side of the front edge portion of the mirror base while crossing in front of the door-side panel, it is possible to suppress traveling air from entering the mounting portion of the door mirror without causing deterioration in the appearance from an outside of the vehicle.

DESCRIPTION OF EMBODIMENTS

Figure 1:
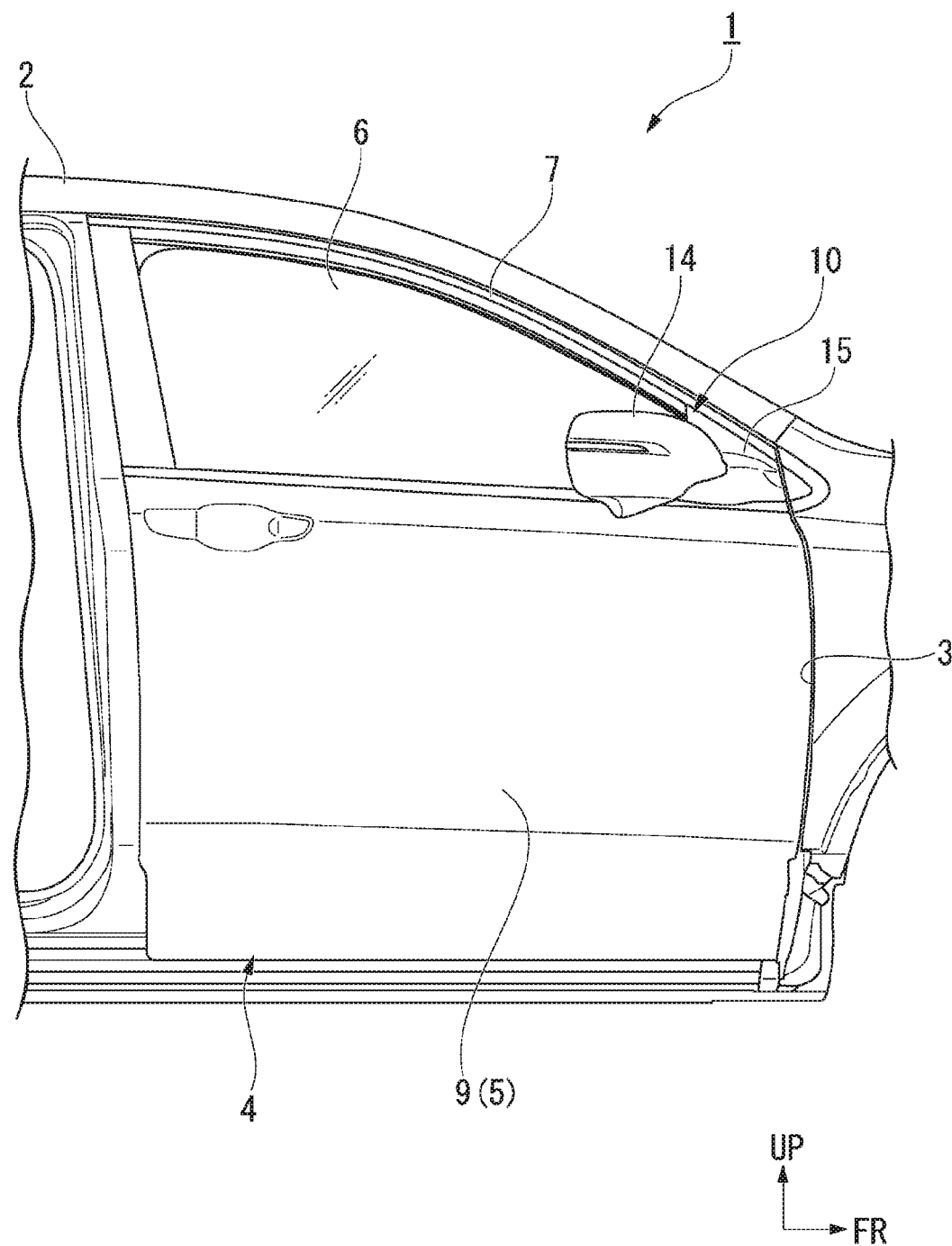
FIG. 1 is a side view of a vehicle according to an embodiment of the present invention.

Hereinafter, an embodiment of the present invention will be described with reference to the accompanying drawings. Further, in the following description, directions of upward, downward, forward and rearward mean directions of upward, downward, forward and rearward in a vehicle body attachment state unless the context clearly indicates otherwise. In addition, in appropriate places in the drawings, an arrow UP that designates an upward direction, an arrow FR that indicates a forward direction, and an arrow LH that indicates a leftward direction are provided. In addition, arrows O and I in the drawings that indicate an inward direction and an outward direction with respect to a vehicle are provided.

FIG. 1 is a view showing a right surface of a vehicle 1 according to the embodiment.

In the vehicle 1, a door opening section 3 is formed at a side surface of a front side of a vehicle body 2, and a door 4 is attached to the door opening section 3 to be opened and closed using a front end portion side as a pivot support point.

The door 4 includes a door main body 5, and a door sash 7 attached integrally to an upper section of the door main body 5 and configured to hold an outer edge portion of an elevation glass 6. A front end portion of the door sash 7 is inclined forward along a vehicle body shape, and a door mirror 10 is attached to a trapezoidal region sandwiched between an upper side of a front section side of the door main body 5 and the door sash 7.

Figure 2:
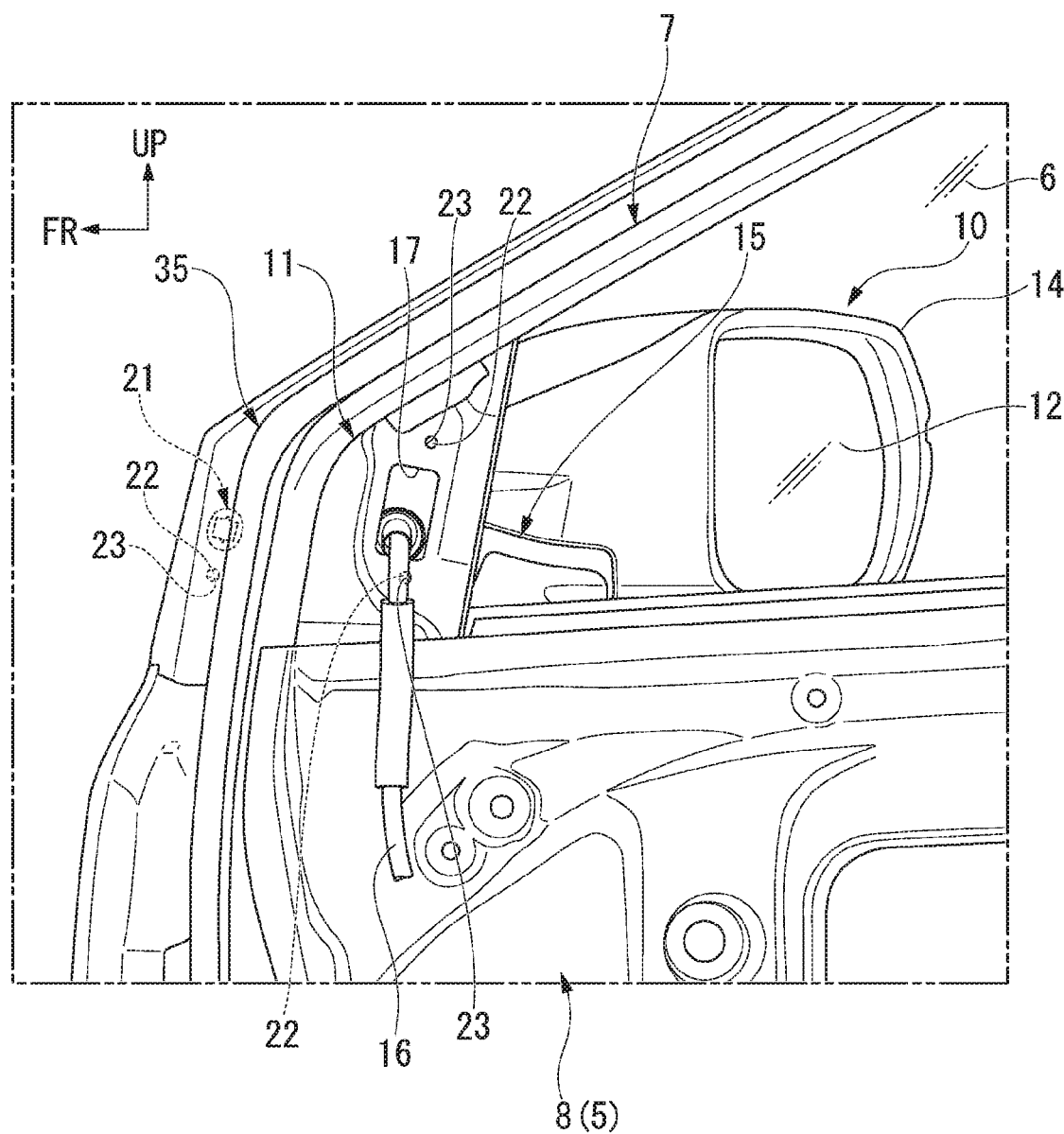
FIG. 2 is a side view from an inside of a vehicle in which some parts of a door according to the embodiment of the present invention are removed.
Figure 3:
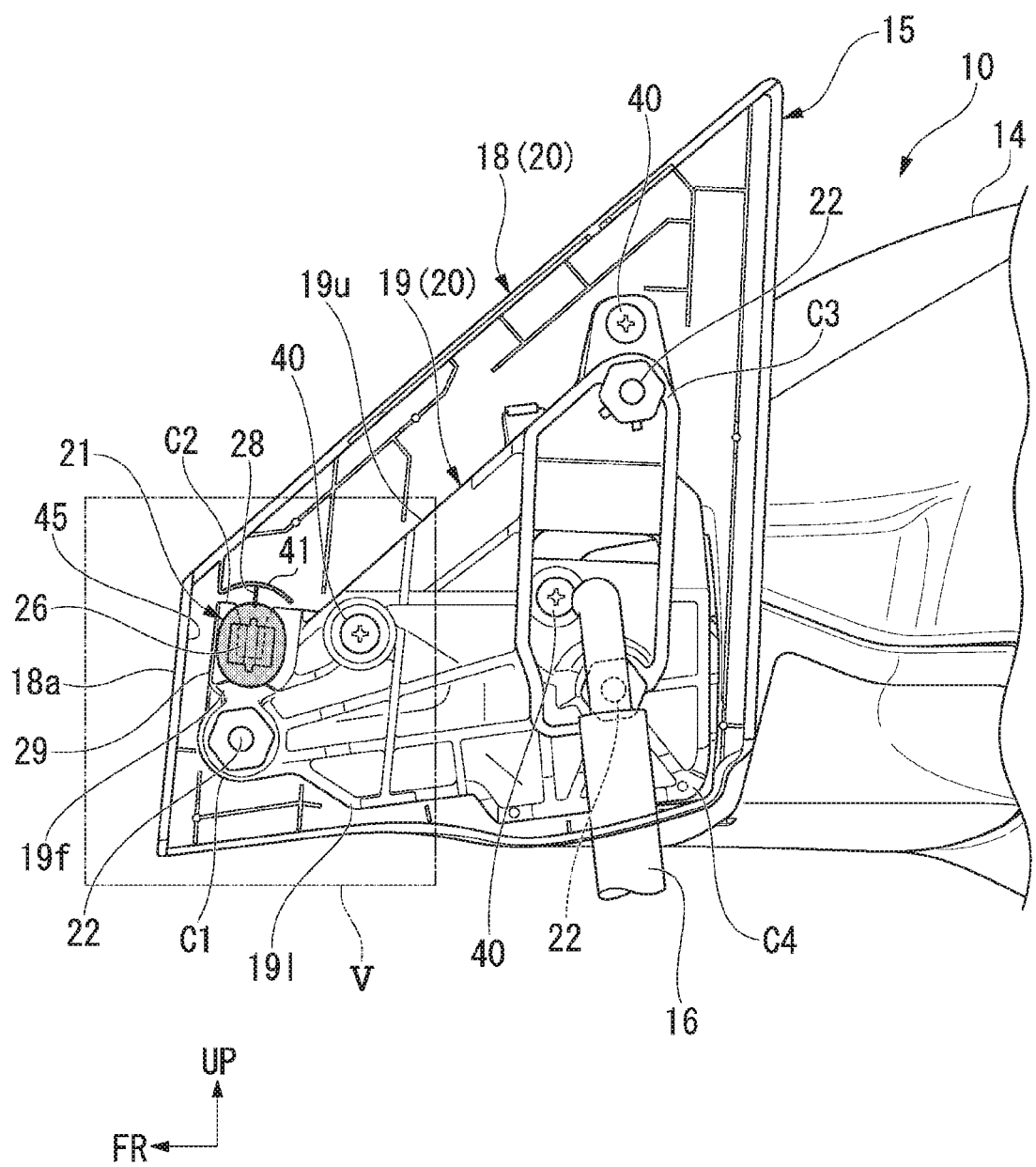
FIG. 3 is a side view in which some parts of a door mirror according to the embodiment of the present invention are removed.
Figure 4:
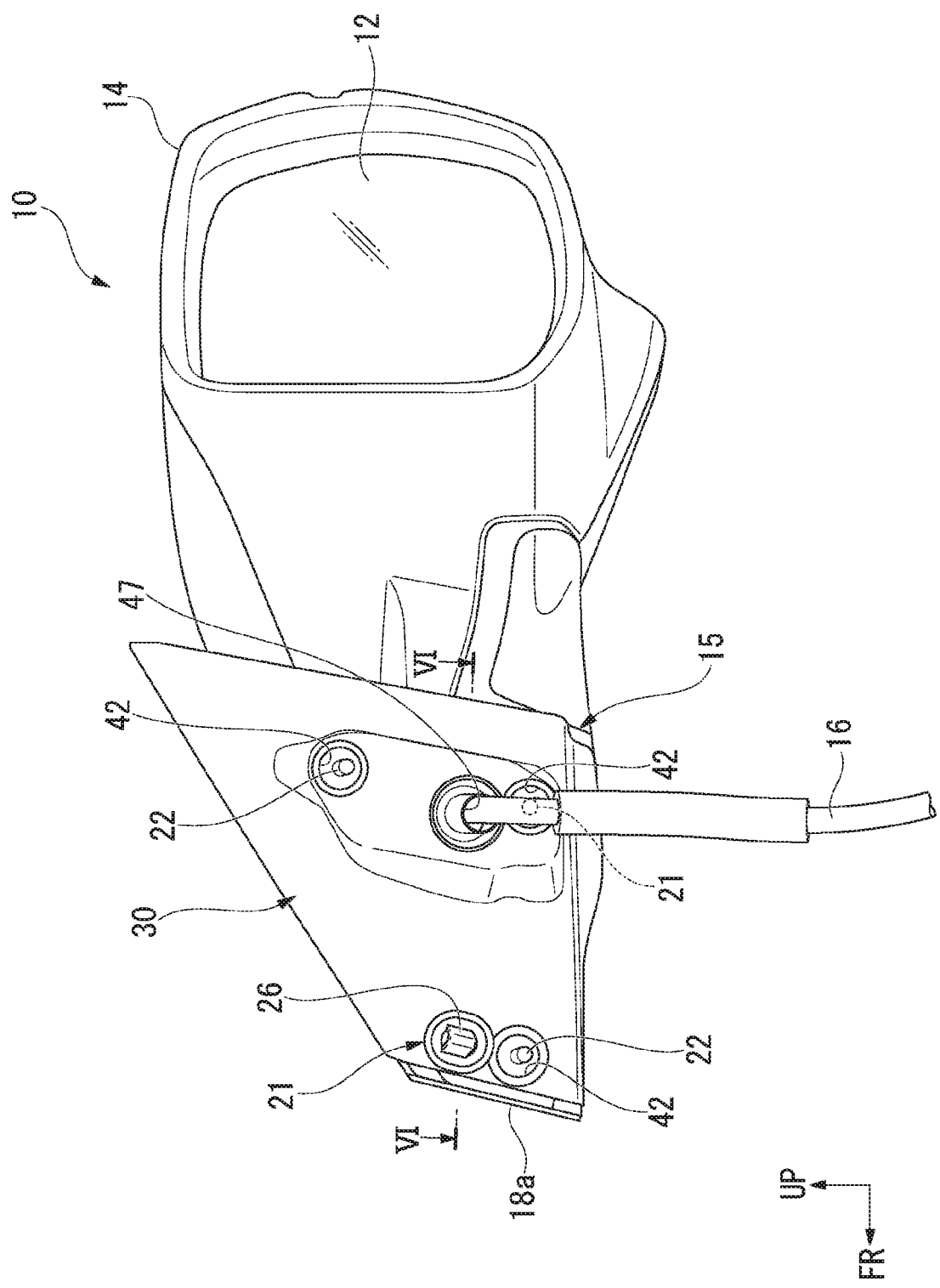
FIG. 4 is a side view of the door mirror according to the embodiment of the present invention.
Figure 5:
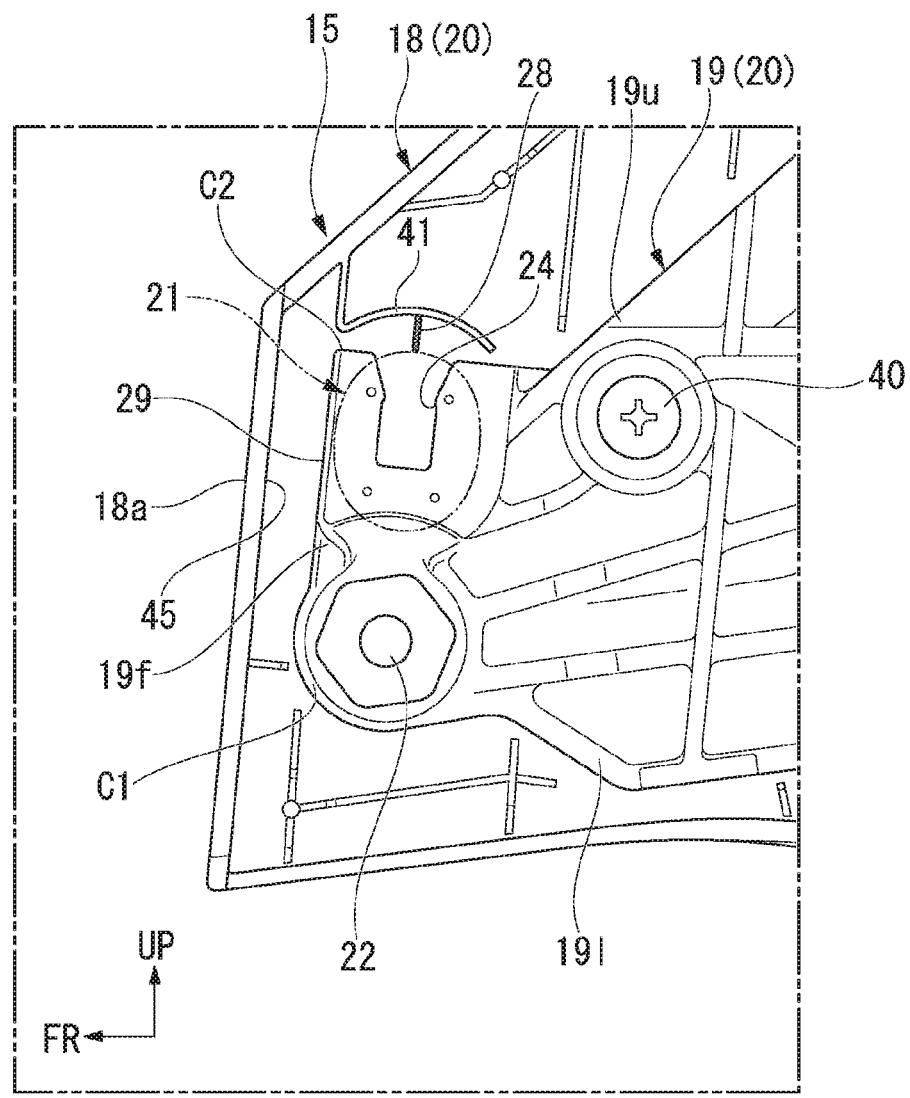
FIG. 5 is an enlarged view of a portion V in FIG. 3 of the door mirror according to the embodiment of the present invention.

FIG. 2 is a view showing a front region of the door 4 and the door mirror 10 when seen from an inside of the vehicle in which parts inside the vehicle such as a door lining and the like are removed. FIG. 3 is a view showing a part of the door mirror 10, from which some parts are removed, when seen from an inside of the vehicle, and FIG. 4 is a view showing the door mirror 10 when seen from an inside of the vehicle as a whole. In addition, FIG. 5 is an enlarged view of a portion V in FIG. 3.

In the door main body 5, an outer circumferential edge portion of a door skin 9 shown in FIG. 1 is coupled to a vehicle outward side of a door panel 8 shown in FIG. 2.

A guide mechanism or the like for the elevation glass 6 is installed in a space provided between the door panel 8 and the door skin 9.

A lower end region on the front side of the door sash 7 is coupled to the door panel 8.

As shown in FIG. 2, a door upper panel 11 (a door-side panel) formed of a metal and having a lower end coupled to the door panel 8 is disposed in a region sandwiched between an upper side on the front side of the door panel 8 and the door sash 7. The door upper panel 11 is formed in a substantially trapezoidal shape having an upper side that is inclined downward toward a diagonal front side, and a front edge portion and an upper edge portion are integrated with the door sash 7. Even when the door upper panel 11 is formed integrally with the door sash 7, the door upper panel 11 may be formed as a separate part and coupled to the door sash 7.

The door mirror 10 is attached to a vehicle outer surface of the door upper panel 11.

Figure 6:
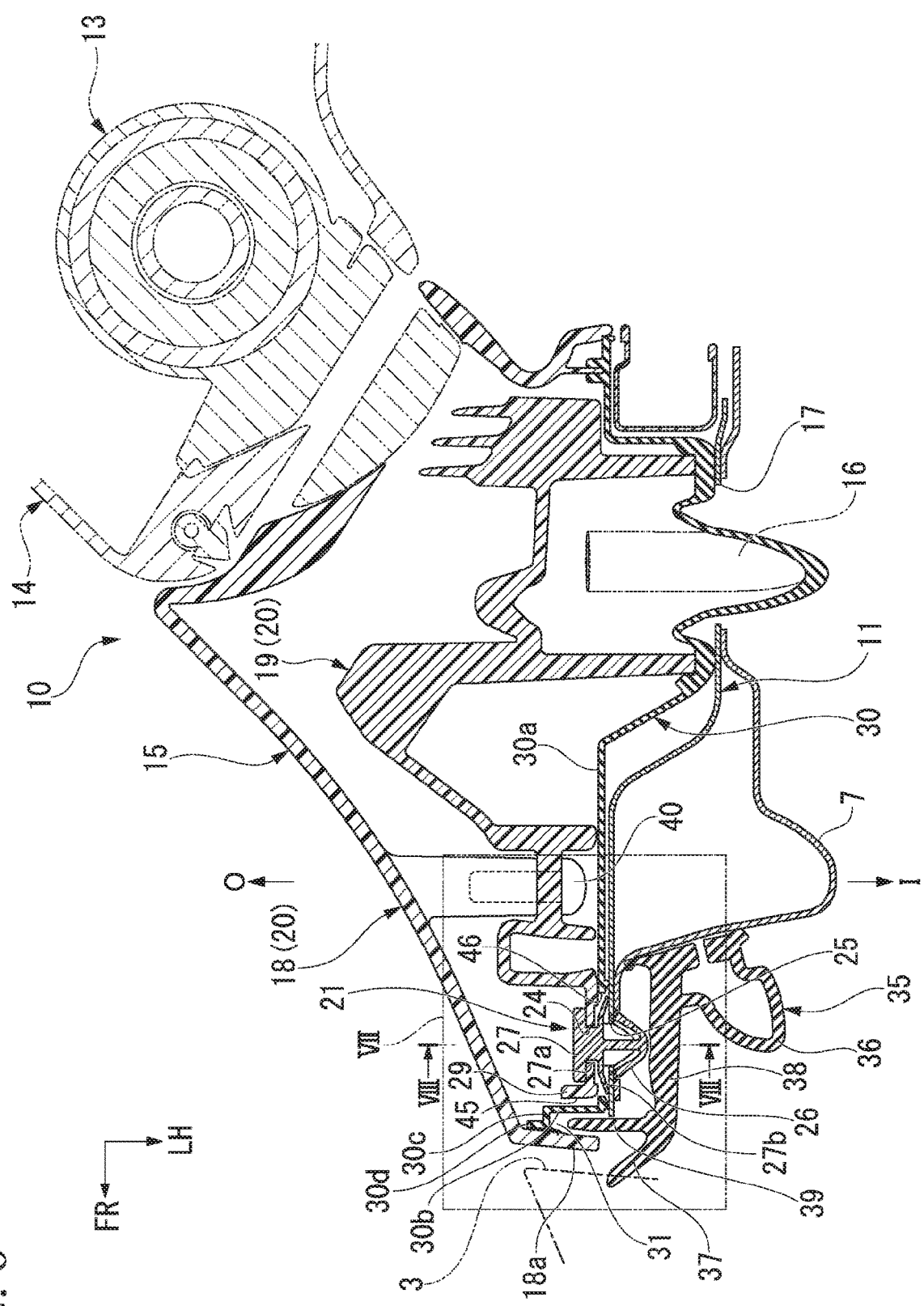
FIG. 6 is a cross-sectional view corresponding to a cross section of a mounting portion of the door mirror according to the embodiment of the present invention taken along line VI-VI in FIG. 4.
Figure 7:
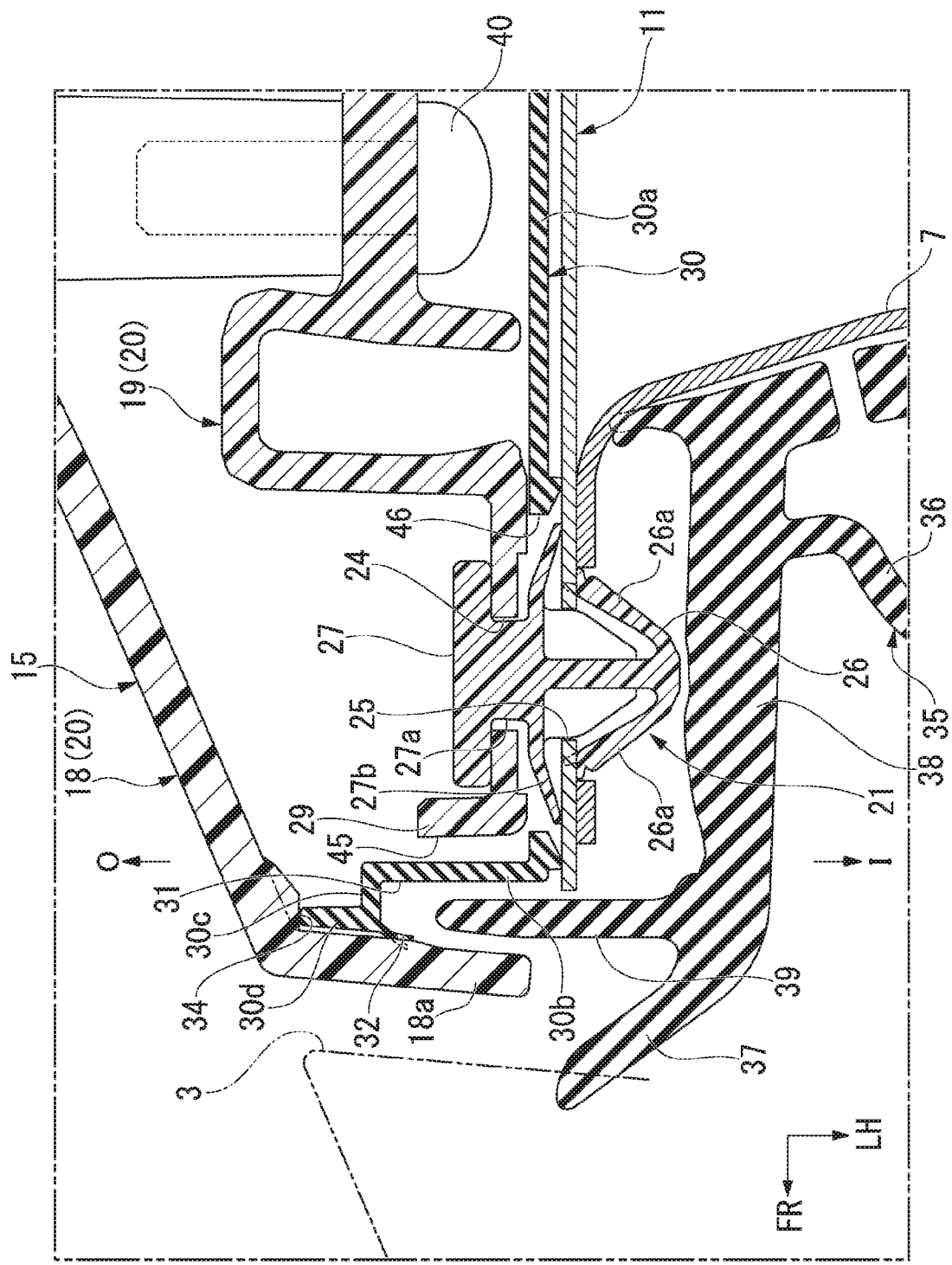
FIG. 7 is an enlarged view of a portion VII in FIG. 6 of the mounting portion of the door mirror according to the embodiment of the present invention.
Figure 8:
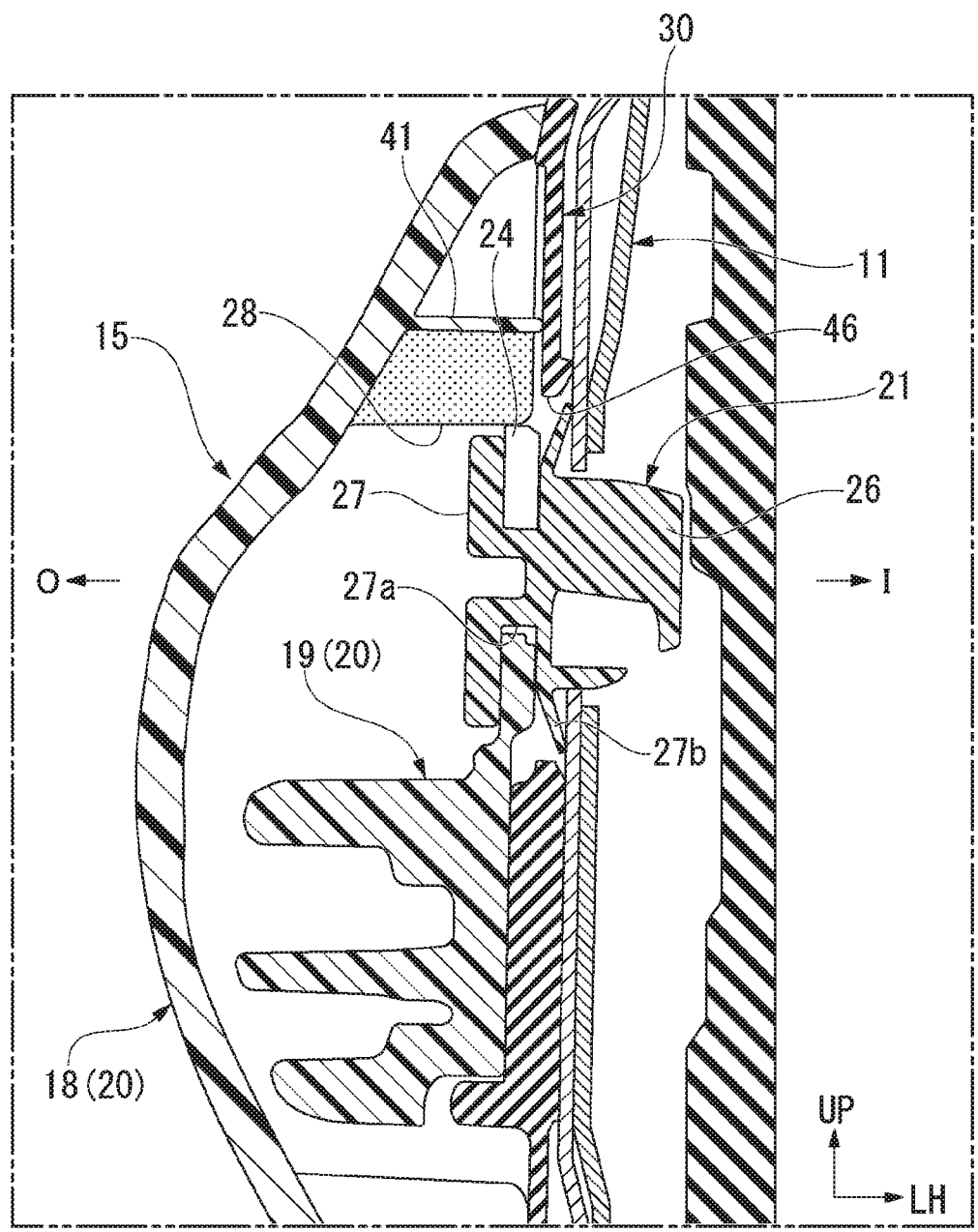
FIG. 8 is a cross-sectional view of the mounting portion of the door mirror according to the embodiment of the present invention taken along line VIII-VIII in FIG. 6.

FIG. 6 is a view showing a cross section taken along line VI-VI in FIG. 4, and FIG. 7 is an enlarged view of a portion VII in FIG. 6. In addition, FIG. 8 is a view showing a cross section taken along line VIII-VIII in FIG. 6.

The door mirror 10 includes a mirror body holding section 13 (see FIG. 6) configured to hold a mirror body 12, a mirror housing 14 configured to cover an outside of the mirror body holding section 13, and a mirror base 15 configured to hold the mirror body holding section 13 and the mirror housing 14 and attach them to an outer surface of the door upper panel 11 in a held state. The mirror body holding section 13 and the mirror housing 14 are held with respect to the mirror base 15 via an electric pivot mechanism (not shown). The pivot mechanism is a mechanism configured to switch the mirror body holding section 13 and the mirror housing 14 to any one of a using position and a storing position. The mirror body 12 is directed toward a rear side of the vehicle body at the using position, and the mirror body 12 is directed toward an inside of the passenger compartment at the storing position. In addition, an electric posture adjustment mechanism (not shown) configured to adjust a posture of the mirror body 12 is held by the mirror body holding section 13. An electric cable 16 is connected to the pivot mechanism or the posture adjustment mechanism, and the electric cable 16 is pulled out from an end surface portion of the mirror base 15 on an inside of the vehicle. An insertion hole 17 (see FIG. 2) configured to allow the electric cable 16 to be pulled into the door 4 is formed in the door upper panel 11.

The mirror base 15 includes a base main body section 20 having an outer base 18 and an inner base 19, and a clip 21 attached to the base main body section 20 and configured to temporarily hold the base main body section 20 to the door upper panel 11 when the base main body section 20 is fastened and fixed to the door upper panel 11. The clip 21 constitutes an extraction restricting section according to the embodiment configured to function as a temporary holding section.

As shown in FIG. 3, the mounting portion of the inner base 19 with respect to the door upper panel 11 is formed in a substantially trapezoidal shape in which an upper side thereof is inclined downward toward a diagonal front side when seen from inside of the vehicle.

The inner base 19 is attached to the outer base 18 from an inside of the vehicle by three screws 40, and configured to cover the inner base 19 on an outside of the vehicle. The outer base 18 is exposed toward an outer side of the vehicle in a state in which the mirror base 15 is attached to the door upper panel 11.

As shown in FIG. 3, the base part of the outer base 18 facing the outer surface of the door upper panel 11 is formed in a substantially trapezoidal shape in which an upper side thereof is inclined downward toward a diagonal front side when seen in a side view from an inside of the vehicle. A circumferential wall 18a protruding in an inward direction of the vehicle is formed on a circumferential region of the base part of the outer base 18. The base part of the outer base 18 is formed to have an external form that is slightly larger than that of the mounting portion of the inner base 19, and the mounting portion of the inner base 19 is disposed on a side inward therefrom.

Here, as shown in FIG. 3, the mounting portion of the inner base 19 has a lower edge portion 19l formed substantially along an upper side of the door main body 5 (the door panel 8), a front edge portion 19f formed substantially along an upward extension region of the door sash 7 on the front side, and an upper edge portion 19u formed substantially along a region of the door sash 7 extending so as to incline upward and rearward from an upper end portion of an upward extension region of the door sash 7.

Here, in the mounting portion of the inner base 19, a corner section on a lower side sandwiched between the front edge portion 19f and the lower edge portion 19l is referred to as a front lower corner section C1, and a corner section on an upper side sandwiched between the front edge portion 19f and the upper edge portion 19u is referred to as a front upper corner section C2. In addition, a corner section of the upper edge portion 19u on a rear side is referred to as a rear upper corner section C3, and a corner section of the lower edge portion 19l on a rear side is referred to as a rear lower corner section C4.

In the case of the embodiment, screw shafts 22, which are fastening sections, are provided so as to protrude in the vicinity of each of the front lower corner section C1, the rear upper corner section C3, and the rear lower corner section C4 among the mounting portion of the inner base 19. The screw shafts 22 protrude in a direction of the door upper panel 11 and are inserted into insertion holes 23 (see FIG. 2) formed at corresponding positions of the door upper panel 11. Nuts (not shown) are fastened to the screw shafts 22 protruding from the insertion holes 23. The mirror base 15 is fastened and fixed to the door upper panel 11 thereby.

Figure 9:
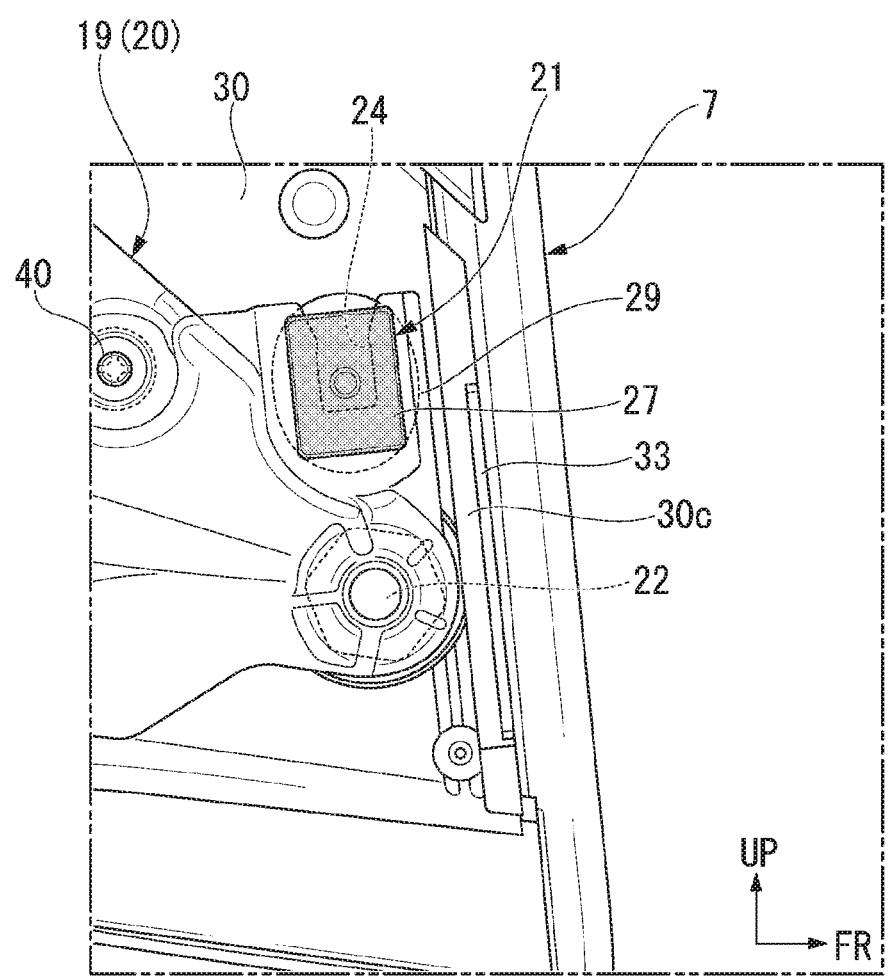
FIG. 9 is a perspective view of a part of a mirror base according to the embodiment of the present invention.

FIG. 9 is a view showing a front end portion of the inner base 19, from which the outer base 18 is removed, when seen from an outside of the vehicle.

As shown in FIG. 9, a holding groove 24 extending downward from the upper end portion of the inner base 19 is formed in the vicinity of the front upper corner section C2 among the mounting portion of the inner base 19. The clip 21 that is an extraction restricting section is held in the holding groove 24. The clip 21 is held at a position substantially immediately above the protruding position of the screw shaft 22 of the front lower corner section C1.

As shown in FIGS. 6 and 7, a locking hole 25 into which the clip 21 held by the inner base 19 is inserted and locked is formed in the door upper panel 11. In the embodiment, the locking hole 25 constitutes a locking section of the door upper panel 11.

The clip 21 has an insertion engaging section 26 that is able to be inserted into and engaged with the locking hole 25 of the door upper panel 11, and a head section 27 continuously formed on the insertion engaging section 26. The insertion engaging section 26 has a pair of locking walls 26a that are interconnected such that tip portions converge in a chevron shape, and the pair of locking walls 26a are squeezed and inserted into the locking hole 25 of the door upper panel 11. The pair of locking walls 26a elastically returns to its original shape after passing through the locking hole 25, and abuts a hole edge of the locking hole 25 from an inside of the vehicle.

A locking groove 27a locked to an edge portion of the holding groove 24 of the inner base 19, and an elastic flange 27b elastically abutting the hole edge of the locking hole 25 of the door upper panel 11 from an outside of the vehicle are provided on the head section 27. The head section 27 causes the locking groove 27a to coincide with a position of the holding groove 24 of the inner base 19, and slides downward from an opening of the holding groove 24 on an upper end side to be held at the lowermost end position of the holding groove 24.

Here, while the clip 21 that is the extraction restricting section can temporarily hold the mirror base 15 on the door upper panel 11 by engaging the insertion engaging section 26 with the locking hole 25 of the door upper panel 11 before fastening and fixing the mirror base 15 to the door upper panel 11, the clip 21 can maintain a large holding force using the locking walls 26a on the insertion engaging section 26 side and the elastic flange 27b on the head section 27 side even after completion of fastening and fixing of the mirror base 15. Accordingly, the clip 21 can strongly fix the mirror base 15 to the door upper panel 11 in cooperation with the fastening force of the screw shafts 22 and the nuts.

As shown in FIG. 5, a restriction wall 28 disposed to face an opening of the holding groove 24 of the inner base 19 from above projects from an inner surface of the outer base 18 in a state in which the inner base 19 is fixed by the screw 40. The restriction wall 28 is provided while being connected to a reinforcement rib 41 protruding from the inner surface of the outer base 18. The reinforcement rib 41 is disposed to be adjacent to an upper side of the restriction wall 28. The restriction wall 28 abuts the head section 27 of the clip 21 on an opening side (an upper side) of the holding groove 24 when the inner base 19 is fixed to the outer base 18 in a state in which the clip 21 is held in the holding groove 24. For this reason, the restriction wall 28 can restrict extraction displacement of the head section 27 of the clip 21 from the holding groove 24.

In addition, while the holding groove 24 of the inner base 19 is formed along the front edge portion 19f of the inner base 19, a sidewall 29 bent toward an outside of the vehicle at a substantially right angle extends from the front edge portion 19f of the inner base 19. The sidewall 29 is formed throughout the area of the front edge portion 19f in which at least the holding groove 24 is formed. The sidewall 29 functions to reinforce a side edge portion of the holding groove 24.

In addition, a mirror seal 30 interposed between the mirror base 15 and the door upper panel 11 is attached to a mounting surface of the mirror base 15 with respect to the door upper panel 11 (end surfaces of the outer base 18 and the inner base 19 on an inside of the vehicle). The mirror seal 30 is constituted by a sheet-shaped elastic member.

As shown in FIGS. 6 and 7, the mirror seal 30 has a seal main body section 30a extending along an outer surface of the door upper panel 11, an outside extension section 30b extending from a front end portion of the seal main body section 30a toward an outer side of the vehicle along the sidewall 29 of the inner base 19, and a front extension section 30c extending forward from an end portion of the outside extension section 30b at an outer side of the vehicle and having a front end portion side abutting an inner surface of the front-side circumferential wall 18a of the outer base 18, in a state in which the mirror base 15 is attached to the door upper panel 11. An opening section 46 for allowing the insertion engaging section 26 of the clip 21 to protrude toward the side of the door 4 and an opening section 47 (see FIG. 4) for allowing the electric cable 16 to be extracted are formed in the seal main body section 30a. In addition, a hole 42 for allowing the screw shafts 22 to protrude toward the side of the door 4 is formed in the seal main body section 30a.

In addition, a groove-shaped concave section 31 surrounded by the circumferential wall 18a of the outer base 18, and the outside extension section 30b and the front extension section 30c of the mirror seal 30 is formed at the inside the front-side circumferential wall 18a of the outer base 18. A wind entering restriction wall 39 of a door weatherstrip 35, which will be described below, is inserted into the concave section. A thickness of the wind entering restriction wall 39 is smaller than a width of the concave section 31 in the forward/rearward direction.

Further, the outside extension section 30b and the front extension section 30c of the mirror seal 30 are disposed at front side of the sidewall 29 of a front edge portion of the inner base 19, and the front-side circumferential wall 18a of the outer base 18 and the sidewall 29 of the inner base 19 constitute an accommodating groove 45 into which the wind entering restriction wall 39 of the door weatherstrip 35 is inserted.

As shown in FIG. 7, a lip-shaped section 32 extending forward and toward an inside of the vehicle is provided on a front end portion of the front extension section 30c of the mirror seal 30. The lip-shaped section 32 is formed to be thinner than a general section (the other portion) of the front extension section 30c, and can be easily bent and deformed in comparison with the general section. In the embodiment, the lip-shaped section 32 constitutes an easily deformable section. The lip-shaped section 32 abuts the inner surface of the front-side circumferential wall 18a of the outer base 18 while elastically deforming rearward.

In addition, as shown in FIG. 7, a second outside extension section 30d extending to be bent toward an outside of the vehicle at a substantially right angle extends from the front end portion of the front extension section 30c of the mirror seal 30. An end surface of the second outside extension section 30d in an extension direction abuts a wall 34 in an inner bottom surface of the outer base 18. An end surface of the wall 34 abutting the second outside extension section 30d is constituted by a surface of the second outside extension section 30d substantially perpendicular to the extension direction.

The door weatherstrip 35 configured to close a space between the door 4 and the door opening section 3 on the vehicle body 2 side is attached to the door sash 7 and the outer circumferential region of the door main body 5. As shown in FIGS. 6 and 7, the door weatherstrip 35 includes a hollow main lip 36 that elastically contacts with an area of the door opening section 3 relatively close to an inside of the vehicle during door closing, and a sub lip 37 abutting a position of the door opening section 3 close to the vehicle outer surface. The main lip 36 and the sub lip 37 are connected by a relay section 38.

As shown in FIGS. 6 and 7, the wind entering restriction wall 39 crossing a front side of the door upper panel 11 from the relay section 38 and protruding from the door upper panel 11 toward an outside of the vehicle extends from a region of the door weatherstrip 35 disposed inside a front edge portion of the mirror base 15. The wind entering restriction wall 39 is inserted into the concave section 31 inside the mirror base 15 across a front side of the door upper panel 11.

The wind entering restriction wall 39 is inserted into the concave section 31, and thus, also inserted into the accommodating groove 45 formed by the front-side circumferential wall 18a of the outer base 18 and the sidewall 29 of the inner base 19.

The door mirror 10 is attached to the door upper panel 11 on the door main body 5 side as described below.

In the door mirror 10, components including the mirror seal 30 are assembled in advance. Here, the insertion engaging section 26 of the clip 21 that is the extraction restricting section and the screw shafts 22 that are the fastening sections protrude from the mirror seal 30.

In this state, the insertion engaging section 26 of the clip 21 on the door mirror 10 side is inserted into the locking hole 25 of the door upper panel 11 from an outside of the vehicle, and the insertion engaging section 26 is locked to the hole edge of the locking hole 25. The door mirror 10 (the mirror base 15) is temporarily held by them at the door upper panel 11 on an outside of the vehicle. In addition, the screw shafts 22 corresponding to the door mirror 10 side are inserted into the three insertion holes 23 on the door upper panel 11 at this time.

Next, in the door upper panel 11 at an inside of the vehicle, fixing nuts are fastened to the screw shafts 22 passing through the insertion holes 23 from the door upper panel 11 on the inside of the vehicle. The door mirror 10 is fastened and fixed to the door upper panel 11 by them.

In addition, while the door weatherstrip 35 is attached to the door main body 5 and the outer circumferential region of the door sash 7 afterward, the wind entering restriction wall 39 extending from the door weatherstrip 35 is inserted into the concave section 31 (the accommodating groove 45) of the front edge portion of the mirror base 15 while crossing in front of the door upper panel 11.

As described above, in the mounting portion structure of the door mirror 10 according to the embodiment, the concave section 31 at least a part thereof is formed by the outer edge portion of the mirror seal 30 and that opens toward a side of the door is provided at an inner side of the front edge portion of the mirror base 15, and the wind entering restriction wall 39 of the door weatherstrip 35 is inserted into the concave section 31 at an inner side of the front edge portion of the mirror base 15 while crossing in front of the door-side panel 11. For this reason, traveling air that may flow into a space between the door upper panel 11 and the mirror base 15 or the inside of the mirror base 15 can be blocked by the wind entering restriction wall 39. In addition, since a tip portion of the wind entering restriction wall 39 is inserted into the concave section 31 positioned at inner side of the front edge portion of the mirror base 15, the tip portion cannot be easily seen from the outside of the vehicle. Accordingly, when the mounting portion structure of the door mirror 10 according to the embodiment is employed, it is possible to curb traveling air from entering the mounting portion of the door mirror 10 without causing deterioration in the appearance from an outside of the vehicle.

In addition, in the mounting portion structure of the door mirror 10 according to the embodiment, since the thickness of the wind entering restriction wall 39 inserted into the concave section 31 of the mirror base 15 is smaller than the width of the concave section 31 in the forward/rearward direction, even when dispersion or the like of assembly to the door mirror 10 or the door weatherstrip 35 is somewhat provided, the wind entering restriction wall 39 can be easily inserted into the concave section 31. Further, even when the wind entering restriction wall 39 does not directly abut with the wall of the concave section 31, since the wind entering restriction wall 39 and the concave section 31 constitute a labyrinth structure, it is possible to suppress traveling air from entering a space between the door upper panel 11 and the mirror base 15 or the inside of the mirror base 15. Accordingly, when the configuration is employed, deterioration of assembly performance of the door weatherstrip 35 with respect to the door mirror 10 can also be prevented.

In addition, in the mounting portion structure of the door mirror 10 according to the embodiment, the mirror seal 30 has the outside extension section 30b extending from the front end portion of the seal main body section 30a toward the vehicle outer side, and the front extension section 30c extending forward from the end portion of the outside extension section 30b at the vehicle outer side and having the front end portion thereof abutting the front-side circumferential wall 18a of the outer base 18, and the concave section 31 is formed so as to be surrounded by the circumferential wall 18a of the outer base 18 and the outside extension section 30b and the front extension section 30c of the mirror seal 30. For this reason, in comparison with the case in which the concave section 31 is formed in a single body of the mirror seal 30, a shape of the mirror seal 30 can be simplified. Accordingly, when the configuration is employed, the mirror seal 30 can be easily manufactured.

Further, in the case of the mounting portion structure of the door mirror 10 according to the embodiment, the front extension section 30c of the mirror seal 30 has the easily deformable section (the lip-shaped section 32) that can be more easily deformed than the other area at the front end portion, and the easily deformable section abuts the circumferential wall 18a of the outer base 18. For this reason, the front end portion of the front extension section 30c can easily and securely come in close contact with the circumferential wall 18a of the outer base 18, and it is possible to securely suppress traveling air from flowing into the mirror base 15.

In addition, while the easily deformable section (the lip-shaped section 32) of the front end of the front extension section 30c abuts the circumferential wall 18a of the outer base 18 to be relatively largely bent, since the easily deformable section (the lip-shaped section 32) is disposed in the concave section 31, the bent portion is not seen from the outside and the appearance is not deteriorated.

Further, in the case of the embodiment, since the easily deformable section of the front end of the front extension section 30c is constituted by the lip-shaped section 32 extending forward and toward an inside of the vehicle, when the outside extension section 30b or the front extension section 30c of the mirror seal 30 is inserted and assembled into the outer base 18, the easily deformable section can be deformed to conform to insertion of the outside extension section 30b or the front extension section 30c without inverting the lip-shaped section 32. Accordingly, when the configuration is employed, assembly workability of the mirror seal 30 can be increased.

Further, in the mounting portion structure of the door mirror 10 according to the embodiment, the second outside extension section 30d extending toward the vehicle outer side and abutting with the wall 34 in the outer base 18 in the extension direction of the second outside extension section 30d is provided so as to extend from the front extension section. For this reason, rigidity of the front extension section 30c is increased by the second outside extension section 30d, and excessive bending of the base section of the lip-shaped section 32 or folding deformation of the front extension section 30c to the outside extension section 30b using an articulated section as an origin can be prevented.

Further, the present invention is not limited to the embodiment and various design changes may be made without departing from the scope of the present invention. For example, while the fastening section on the inner base 19 side configured to fasten and fix the mirror base 15 to the door upper panel 11 is constituted by the screw shafts 22 in the embodiment, the fastening section is not limited thereto and may be a nut fixed to the inner base 19. In this case, when a bolt is fastened to a nut from the door upper panel 11 on an inside of the vehicle, the mirror base 15 is fastened and fixed to the door upper panel 11.

REFERENCE SIGNS LIST

4 Door
5 Door main body

10 Door mirror
11 Door upper panel (door-side panel)
15 Mirror base
30 Mirror seal
30a Seal main body section
30b Outer extension section
30c Front extension section
30d Second outside extension section
31 Concave section
32 Lip-shaped section
35 Door weatherstrip
39 Wind entering restriction wall

What is claim is:

1. A mounting portion structure of a door mirror, comprising:
a door-side panel;
a door mirror having a mirror base attached to the door-side panel and a mirror seal disposed between the mirror base and the door-side panel; and
a door weatherstrip attached to an outer edge portion of a door and configured to close a space between the door and a door opening section of a vehicle body,
wherein a concave section at least a part thereof is formed by an outer edge portion of the mirror seal and that opens toward a side of the door is provided at an inner side of a front edge portion of the mirror base, and
the door weatherstrip has a wind entering restriction wall that crosses a front side of the door-side panel and protrudes in a vehicle outer side than the door-side panel, and that is inserted into the concave section.

2. The mounting portion structure of a door mirror according to claim 1, wherein a thickness of the wind entering restriction wall is smaller than a width of the concave section in a forward/rearward direction.

3. The mounting portion structure of a door mirror according to claim 1, wherein the mirror seal includes:
a seal main body section extending along the door-side panel;
an outside extension section extending from a front end portion of the seal main body section toward the vehicle outer side; and
a front extension section extending forward from an end portion of the outside extension section at the vehicle outer side and having a front end portion thereof abutting a front-side circumferential wall of the mirror base, and
the concave section is formed so as to be surrounded by the circumferential wall of the mirror base, and the outside extension section and the front extension section of the mirror seal.

4. The mounting portion structure of a door mirror according to claim 3, wherein the front extension section has an easily deformable section, which is more easily deformed than the other area of the front extension section, formed at a front end portion thereof, and
the easily deformable section is abutted with the circumferential wall of the mirror base.

5. The mounting portion structure of a door mirror according to claim 4, wherein the easily deformable section is formed in a lip shape extending forward and toward an inner side of the vehicle.

6. The mounting portion structure of a door mirror according to claim 5, wherein a second outside extension section extending toward the vehicle outer side and abutting with the mirror base in an extension direction of the second outside extension section is provided so as to extend from the front extension section.

* * * * *